June 8, 1948.  C. S. ROYS  2,442,861
ALTERNATING CURRENT COMMUTATOR DYNAMOELECTRIC MACHINE
Filed Oct. 7, 1946
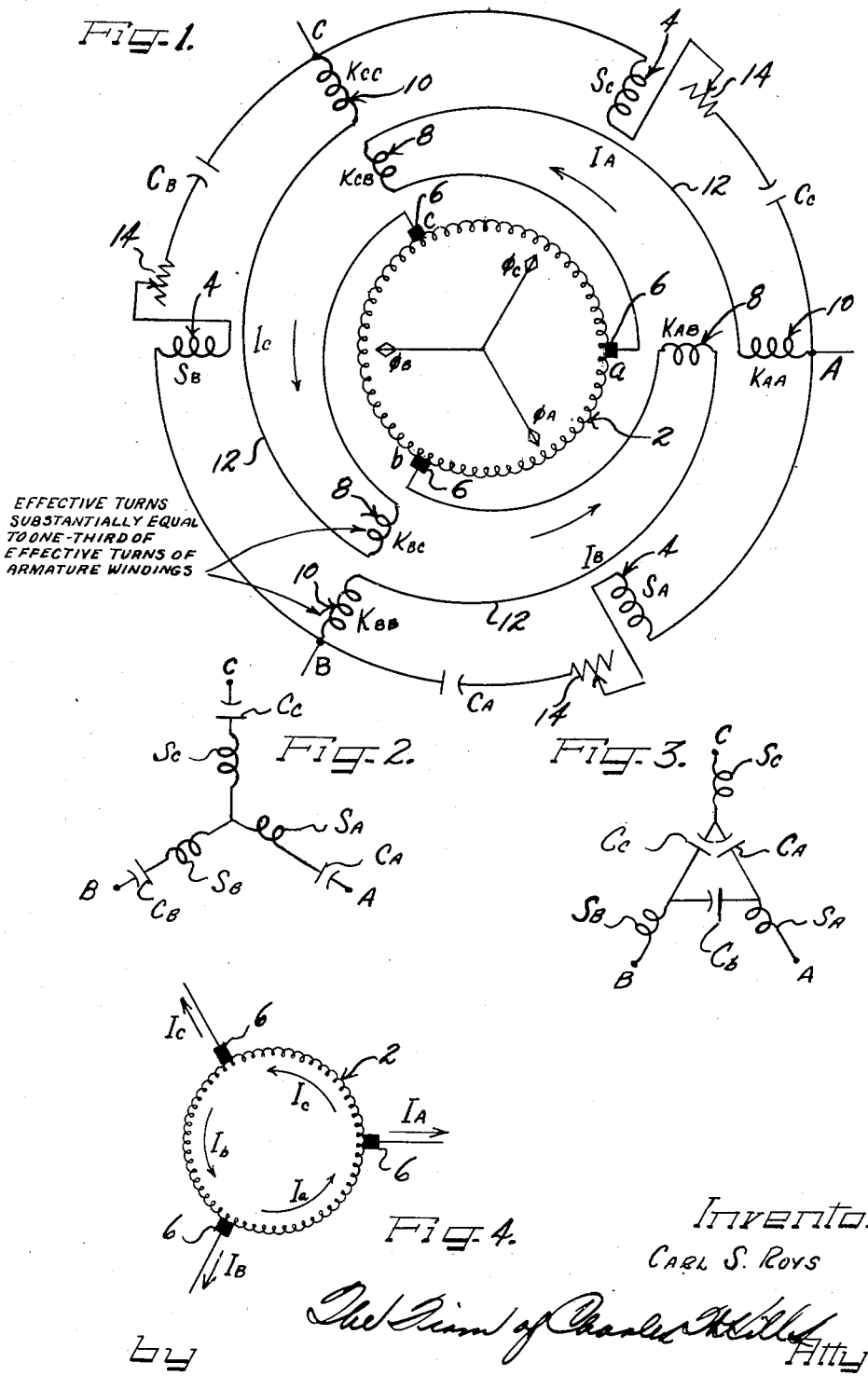
Inventor
CARL S. ROYS Patented June 8, 1948

2,442,861

UNITED STATES PATENT OFFICE 2,442,861

ALTERNATING-CURRENT COMMUTATOR DYNAMOELECTRIC MACHINE

Carl S. Roys, West Chicago, Ill., assignor to Nader Engineering Company, Chicago, Ill., a corporation of Illinois Application October 7, 1946, Serial No. 701,819

10 Claims. (Cl. 318—244)

This invention relates to a dynamoelectric machine, and particularly to an improved polyphase, self-excited, commutator type, dynamoelectric machine.

In my copending application Serial No. 658,060, filed March 29, 1946, there is disclosed and claimed a novel form of alternating current commutator type, dynamoelectric machine wherein a condenser or other form of capacitive reactance is connected in series with exciting field winding of the machine and, as a result of such arrangement, the dynamoelectric machine will function as a self-excited alternating current generator having an output frequency substantially independent of speed or as an alternating current motor whose speed is substantially independent of the frequency of the power supplied to it. In the application of the principles embodied in my aforementioned application to polyphase type dynamoelectric machines, additional problems are encountered, particularly when the self-excited polyphase dynamoelectric machine is to be utilized as a generator supplying an unbalanced load or as a motor with an unbalanced set of line voltages. It has been particularly observed that some form of compensating windings are required to eliminate excessive sparking of the commutator, to provide more desirable voltage and frequency regulation as a function of the load supplied and to eliminate certain undesirable effects resulting from induced voltages in the armature due to transformer action.

Accordingly, it is an object of this invention to provide an improved dynamoelectric machine.

A further object of this invention is to provide an improved alternating current dynamoelectric machine of the polyphase, commutator type susceptible of control by methods and apparatus conventionally associated with control of direct current machines.

A particular object of this invention is to provide an improved polyphase commutator type generator which may be operated self-excited and will generate a polyphase alternating current voltage having a frequency substantially independent of the speed at which the generator is driven or of the nature of the load supplied.

A still further object of this invention is to provide an improved polyphase, commutator type motor having speed characteristics substantially independent of the frequency of the power supply.

Another object of this invention is to provide an improved arrangement of compensating winding for a self-excited, polyphase, commutator type alternating current dynamoelectric machine which will not only greatly improve the commutation of the machine but will provide improved operating characteristics of the machine which are substantially independent of the nature of the load supplied by the machine.

The specific nature of the invention as well as other objects and advantages thereof will become apparent to those skilled in the art from the following detailed description of the annexed sheet of drawings which, by way of preferred example only, illustrate one specific embodiment of the invention.

On the drawings:

Figure 1 is a schematic circuit diagram of a polyphase, commutator type dynamoelectric machine embodying this invention;

Figure 2 is a schematic circuit diagram of a modified connection of the exciting field windings for the dynamoelectric machine of Figure 1;

Figure 3 is a schematic circuit diagram of an additional modified connection of the exciting field windings for the dynamoelectric machine of Figure 1; and Figure 4 is an elementary circuit diagram of a three phase commutator type alternating current machine which illustrates the mathematical relationship of the various phase and line currents of the machine.

As shown on the drawings:

Referring now to the circuit diagram of a dynamoelectric machine embodying this invention shown in Figure 1, it should be understood that the structural elements of such dynamoelectric machine are of conventional construction and may comprise any one of several well known forms of commutator type dynamoelectric machines. Thus there is provided relatively rotatable armature windings 2 and field windings 4 which will be carried on any conventional armature and field core structure (not shown). Armature winding 2 preferably comprises the well known wave or series type winding, while the field windings 4 may constitute the well known distributed type of field windings. The particular dynamoelectric machine illustrated is constructed as a three phase two pole machine and, accordingly, three sets of brushes 6 are provided which respectively cooperate with armature winding 2 through a suitable commutator (not shown). The brushes 6 are mounted in conventional manner so that their electrical axes are 120° displaced and hence such brushes effect a division of the armature winding into three phases designated respectively as $ab$, $bc$, and $ca$. Likewise the field windings 4 are arranged to provide three phases, with the electrical axis of each phase displaced 120° relative to the armature winding 2. The individual phase windings of the field winding 4 are respectively designated as $Sa$, $Sb$, and $Sc$. And these phase windings produce fluxes $\phi_A$, $\phi_B$ and $\phi_C$ linking armature winding 2.

In accordance with this invention, a capacitive reactance is effectively connected in series with each phase of the three phase field winding 4. The resulting series connected field winding phase and capacitive reactance are then respectively connected to the three phase input terminals A, B and C of the machine. In the arrangement illustrated in Figure 1, condensers Ca, Cb, and Cc are respectively connected in series with field winding phases Sa, Sb, and Sc and the resulting series connections are then connected in delta to the line terminals A, B and C of the machine.

An alternative connection of the field winding phases on the capacitive reactances is illustrated in Figure 2. In this arrangement, the field winding phases Sa, Sb and Sc are Y connected, and the capacitive reactances Ca, Cb, Cc are respectively connected in series in each arm of the Y connection. The free ends of the Y connection are then connected to the line terminals A, B and C of the machine. A second alternative arrangement is illustrated in Figure 3. In this arrangement, the capacitive reactances Ca, Cb, and Cc are connected in delta and the field winding phases are then respectively connected between each vertex of the delta connection of capacitors and the line terminals A, B, and C of the machine.

With any of the arrangements heretofore described, and assuming an electrical connection between the line terminals A, B, C, and the brushes a, b and c, respectively, the resulting dynamoelectric machine will exhibit the unusual performance characteristics in operating as a self-excited generator producing a three phase alternating current voltage whose frequency is substantially independent of the speed at which the dynamoelectric machine is driven; or, in motor operation, the machine will operate at a speed which is substantially independent of the frequency of the supply source. Under either condition of operation, however, excessive sparking will occur on the commutator and, furthermore, the machine as a generator will exhibit undesirably large variations in output voltage and frequency as a function of the load supplied by the generator.

To eliminate such difficulties, this invention contemplates the utilization of compensating windings disposed in such manner as to substantially neutralize all effects of armature reaction in the machine. A preferred arrangement of compensating winding is illustrated in Figure 1, wherein two three phase sets of compensating windings are provided which are designated respectively by the numerals 8 and 10. The two sets of compensating windings 8 and 10 are suitably arranged with respect to the armature winding 2 so that the effective electrical axes of the phases of the two sets of compensating windings are in substantial alignment with each other and with the brush axes. Hence, the axis of each compensating winding phase is located substantially midway between the axes of adjacent field winding phases. Suitable connections 12 are provided which respectively connect one phase of one compensating winding in series with a 120° displaced phase of the other compensating winding and then connects both of such windings in series between a line terminal of the machine and the brush located on the electrical axis of one of the series connected compensating windings. Thus the phase designated as Kaa of compensating winding 10 is connected between line terminal A of the machine and brush a through a series connection with the phase designated Kcb of compensating winding 8. Similar connections are made between the remaining line terminals of the machine and the remaining brushes. It will be understood that similar connections of the compensating windings 8 and 10 with respect to the line terminals A, B and C and the brushes are made in the modifications of Figs. 2 and 3.

The aforedescribed arrangement of compensating windings provides greatly improved commutation as well as more satisfactory regulation of voltage and frequency characteristics of the machine when operating as a generator, and improved speed characteristics as a function of load when operating as a motor. I have further discovered that optimum performance is obtainable when the effective turns of each phase of each set of compensating windings is proportioned to be substantially equivalent to one-third of the effective turns per phase of the armature winding. The desirable effect of so proportioning the turns of the compensating windings may be readily demonstrated by the following mathematical analysis.

Referring to Figure 4, the relationship between the line currents $I_A$, $I_B$ and $I_C$ of the three phase dynamoelectric machine of Figure 1 with respect to the armature phase currents $I_a$, $I_b$ and $I_c$ may be expressed by application of Kirchoff's current law as follows:

$$I_A = I_a - I_c \quad (1a)$$
$$I_B = I_b - I_a \quad (1b)$$
$$I_C = I_c - I_b \quad (1c)$$
$$I_A + I_B + I_C = 0 \quad (1d)$$

The E. M. F. equation around the closed armature circuit is, $$(Z_{aa} + Z_{ba} + Z_{ca})I_a + (Z_{ab} + Z_{bb} + Z_{cb})I_b + (Z_{ac} + Z_{bc} + Z_{cc})I_c = E_a + E_b + E_c \quad (2)$$

In the above, any operator, $Z_{xy} = R_x^y + jX_{xy}$, is the voltage drop in circuit $-x$ per unit current in circuit $-y$.

$R_{xy}$ is due to copper and core losses.
$X_{xy}$ is due to leakage fluxes only.
$E_a$, $E_b$, $E_c$ are the phase generated voltages exclusive of leakage flux.

For a symmetrical machine, $$Z_{aa} + Z_{ba} + Z_{ca} = Z_{ab} + Z_{bb} + Z_{cb} = Z_{ac} + Z_{bc} + Z_{cc} \quad (3)$$

Furthermore, if the armature reactions can be balanced out for all load conditions, the generated voltages will constitute a balanced system. Hence, $$E_a + E_b + E_c = 0 \quad (4)$$

Substitution of (3) and (4) into (2) now gives, $$I_a + I_b + I_c = 0 \quad (5)$$

Under these conditions, substituting (5) into (1) gives for the phase currents, $$I_a = \frac{I_A - I_B}{3} \quad (6a)$$
$$I_b = \frac{I_B - I_C}{3} \quad (6b)$$
$$I_c = \frac{I_C - I_A}{3} \quad (6c)$$

Now let T equal the effective number of series turns of the armature winding per phase. Multiplication of (6) by T and rearrangement gives, $$TI_a = \frac{T}{3}I_A - \frac{T}{3}I_B \quad (7a)$$
$$TI_b = \frac{T}{3}I_B - \frac{T}{3}I_C \quad (7b)$$
$$TI_c = \frac{T}{3}I_C - \frac{T}{3}I_A \quad (7c)$$

Considering Equations 7a, 7b, and 7c, it will be observed that in each case the left hand element of the equation represents the effective ampere turns of the current flowing in a phase of the armature winding while the right hand elements of the equation constitute functions of two line currents. Therefore, it follows that all of the armature reactions may be neutralized by providing compensating windings whose effective ampere turns are produced in accordance with the right hand side of Equations 7a through 7c. Such conditions are met in the above described circuit arrangement of Figure 1 wherein the effective turns of each phase of the two sets of compensating windings 8 and 10 are respectively equal to one-third of the effective series turns of one phase of the armature winding 2.

It should be particularly noted that the foregoing analysis did not assume the existence of a balanced load, hence the described arrangement of compensating windings will neutralize all armature reactions even when unbalanced line currents are flowing.

While the aforedescribed arrangement of compensating windings is the simplest and involves the least number of turns, alternative arrangements of the compensating windings and proportioning of the turns thereof may be readily derived from Equation 7. Thus by substitution from (1d)

$$TI_a = \frac{-2T}{3}I_B - \frac{T}{3}I_C \quad (8a)$$

$$TI_b = \frac{-2T}{3}I_C - \frac{T}{3}I_A \quad (8b)$$

$$TI_c = \frac{-2T}{3}I_A - \frac{T}{3}I_B \quad (8c)$$

also $$TI_a = \frac{2T}{3}I_A + \frac{T}{3}I_C \quad (9a)$$

$$TI_b = \frac{2T}{3}I_B + \frac{T}{3}I_A \quad (9b)$$

$$TI_c = \frac{2T}{3}I_C + \frac{T}{3}I_B \quad (9c)$$

Hence any arrangement of compensating windings that satisfies one of equation sets (7), (8), or (9) will substantially neutralize all armature reactions.

Further analysis indicates another unusual operating condition when the above described machine is utilized as a generator. For a symmetrical three phase machine the values of the phase generated voltages are equal, or $$|E_a| = |E_b| = |E_c| = E' + E'' = 3/2 WT\phi - \frac{3}{2}WT\phi(1-v) \quad (10)$$

In which $E'$ = generated voltage per phase due to transformer action
$E''$ = generated voltage per phase due to rotation
$W$ = angular velocity of rotating field
$vW$ = angular velocity of armature
$\frac{3}{2}\phi$ = effective value of rotating field It is interesting to note that the generated voltages, $E'$ and $E''$, are in opposition when the armature is moving in the direction of the rotating field. As a result, when $v=1$, the terminal voltages $E_{ab}$, $E_{bc}$ and $E_{ca}$ of the armature are simply equal to the total impedance drops in the armature.

That is, for $v=1$, $$Z_{aa}I_a + Z_{ab}I_b + Z_{ac}I_c = -E_{ab} \quad (11a)$$
$$Z_{ba}I_a + Z_{bb}I_b + Z_{bc}I_c = -E_{bc} \quad (11b)$$
$$Z_{ca}I_a + Z_{cb}I_b + Z_{cc}I_c = -E_{ca} \quad (11c)$$

An added advantage of this method of compensating for armature reaction is that the induced voltages due to transformer action in the armature are neutralized by those in the compensating windings. This can be shown by reference to Figure 1. From this, the total induced voltage between A and B due to transformer action is, $$E_A' = E_a' + \frac{1}{3}[E_b' + E_c' - 2E_a'] = \frac{E_a' + E_b' + E_c'}{3} = 0 \quad (12a)$$

Similarly, $$E_B' = 0 \quad (12b)$$
$$E_C' = 0 \quad (12c)$$

As a result, the terminal voltage of the machine will consist of the generated voltage due to rotation only in the armature, minus the total impedance drop in the armature and compensating windings. The reactive part of any impedance is due only to leakage flux, since all of the effects of the rotating field have been included in the generated voltages.

A dynamoelectric machine embodying the aforedescribed constructions will function with unusually good commutation and operate either as a self-excited generator having a frequency output substantially independent of both speed and load or as a motor whose speed is substantially independent of the frequency of the power source or of the nature of the load. Even though such dynamoelectric machine is an alternating current machine, it is susceptible to control by the convenient methods which were heretofore applicable only to direct current machines. Thus, for example, the voltage output of the dynamoelectric machine when operating as a generator may be conveniently adjusted by the provision of variable resistors 14 respectively connected in series circuit relationship with each phase of the field windings 4. When operating as a motor, the variable resistors 14 provide speed control. Motor speed may also be controlled by varying line voltage—another feature of distinct contrast to conventional alternating current, polyphase motors. Both in generator and motor operation, series fields may be utilized to provide compounding characteristics similar to direct current machines.

As was developed more fully in my above identified copending application, the actual frequency generated by the dynamoelectric machine is a function of the relative values of capacitive and inductive reactance in each phase of the exciting field winding 4. Hence the output frequency of the machine when operating as a generator, or the speed of the machine when operating as a motor may be varied by variation of either the inductance or capacitance of the field winding phases.

Such dynamoelectric machine also exhibits an unusual performance characteristic for a self-excited generator in that it will continue to generate and supply short circuit current in the event of a fault on any one of the load phases; and maintain satisfactory commutation. This feature is of distinct importance in that the flow of short circuit current will permit operation of fault clearing devices. Such short circuit operation is a distinct contrast to all other self-excited alternating current generators which uniformly exhibit the property of either ceasing to generate or sparking excessively upon the occurrence of a fault in any one of the load phases supplied.

It should be noted that in the foregoing mathematical analysis, there was no assumption that the load supplied by the dynamoelectric machine was a balanced load. Accordingly, it follows that the substantially constant frequency and good commutation properties of this dynamoelectric machine when operating as a generator is not dependent upon the maintenance of a balanced load. Hence such dynamoelectric machine is particularly adaptable to aircraft installations wherein there exists concurrently two conditions which have heretofore prevented the successful operation of alternating current systems, namely, a prime mover having a speed variable over wide limits, and predominantly single phase loads which requires that a generator be capable of supplying an unbalanced load during most of its operation.

It will, of course, be understood that various details of the construction may be varied through a wide range without departing from the principles of this invention and it is, therefore, not the purpose to limit the patent granted hereon otherwise than necessitated by the scope of the appended claims.

I claim as my invention:

1. A three phase dynamoelectric machine comprising an armature winding, a commutator, brush means for effecting a three phase connection to said armature winding through said commutator, a three phase field winding constructed to produce a rotating field linking said armature winding, means for exciting said field winding to define a rotating field linking said armature winding, a plurality of compensating windings arranged to produce fields linking said armature winding, there being two compensating windings connected in series circuit between each of said brush means and a terminal of the machine, each of said series connected compensating windings having its electrical axis disposed substantially midway between the electrical axes of two adjacent field winding phases, and each of said compensating windings having a number of effective turns equal to one-third of the effective turns per phase of said armature winding.

2. A three phase dynamoelectric machine comprising an armature winding, a commutator, brush means for effecting a three phase connection to said armature winding through said commutator, a three phase field winding constructed to produce a rotating field linking said armature winding, means for exciting said field winding to define a rotating field linking said armature winding, a plurality of compensating windings arranged to produce fields linking said armature winding, there being two compensating windings connected in series circuit between each of said brush means and a terminal of the machine, said two series connected compensating windings being 120° electrically displaced relative to each other and each of said series windings having a number of effective turns equal to one-third of the effective turns per phase of said armature winding.

3. A self-excited three phase commutator type dynamoelectric machine comprising a balanced armature winding, brush means for effecting a three phase connection to said armature winding, means for connecting each of said brush means to a three phase line, including a pair of series connected compensating windings in each phase connection, each winding of said pair of series connected compensating windings being 120° electrically displaced relative to each other, a three phase field winding constructed and arranged to produce a rotating field linking said armature winding, a condenser in series with each phase of said field winding, and means for connecting each phase of said field winding and the respective condenser across a phase of said three phase line.

4. A self-excited three phase commutator type dynamoelectric machine comprising a balanced armature winding, brush means for effecting a three phase connection to said armature winding, means for connecting each of said brush means to a three phase line, including a pair of series connected compensating windings in each phase connection, each winding of said pair of series connected compensating windings being 120° electrically displaced relative to each other, each of said compensating windings having a number of effective turns equal to one-third of the effective turns per phase of said armature winding, a three phase field winding constructed and arranged to produce a rotating field linking said armature winding, a condenser in series with each phase of said field winding, and means for connecting each phase of said field winding and the respective condenser across a phase of three phase line.

5. A self-excited three phase commutator type dynamoelectric machine comprising a balanced armature winding, brush means for effecting a three phase connection to said armature winding, means for connecting each of said brush means to a three phase line, a pair of compensating windings for each of said brush means arranged with their effective electrical axis aligned with the axis of the brush means, three phase line terminals, means connecting said brush means respectively to said line terminals including a series connection of one of said compensating windings aligned with the brush means axis and one compensating winding electrically displaced by 120° from the brush means axis, a three phase field winding constructed and arranged to produce a rotating field linking said armature winding, a condenser in series with each phase of said field winding, and means for connecting each phase of said field winding and the respective condenser across a phase of said three phase line.

6. A self-excited three phase commutator type dynamoelectric machine comprising a balanced armature winding, brush means for effecting a three phase connection to said armature winding, a pair of compensating windings for each of said brush means arranged with their effective electrical axes aligned with the axis of the respective brush means, three phase line terminals, means connecting said brush means respectively to said line terminals including a series connection of one of said compensating windings aligned with the brush means axis and one compensating winding electrically displaced by 120° from the brush means axis, each of said compensating windings having a number of effective turns equal to one-third of the effective turns per phase of said armature winding, a three phase field winding constructed and arranged to produce a rotating field linking said armature winding, a condenser in series with each phase of said field winding, and means for connecting each phase of said field winding and the respective condenser across a phase of said three phase line.

7. In a three phase, two pole commutator type dynamoelectric machine, a three phase armature winding, a pair of electrically aligned, three phase compensating windings, and means connecting each armature winding phase to a line terminal of the machine in series with one phase of one compensating winding and one 120° electrically displaced phase of the other compensating winding.

8. In a three phase two pole commutator type dynamoelectric machine, a three phase armature winding, a pair of electrically aligned, three phase compensating windings, means connecting each armature winding phase to a line terminal of the machine through a series connection with one phase of one compensating winding and one 120° electrically displaced phase of the other compensating winding, each phase of said compensating windings having a number of effective turns equal to one-third of the effective turns per phase of said armature winding.

9. In a three phase, two pole, self excited commutator type dynamoelectric machine, a three phase armature winding, a pair of electrically aligned, three phase compensating windings, means connecting each armature winding phase to a line terminal machine through a series connection with one phase of one compensating winding and one 120° electrically displaced phase of the other compensating winding, a three phase exciting field winding, a condenser connected in series with each phase of said field winding, and means connecting each of said series connected field winding phases and condensers respectively to a line terminal of the machine.

10. In a three phase, two pole, self excited commutator type dynamoelectric machine, a three phase armature winding, a pair of electrically aligned, three phase compensating winding, means for connecting each armature winding phase to a line terminal of the machine through a series connection with one phase of one compensating winding and one 120° electrically displaced phase of the other compensating winding, each of said compensating windings having a number of effective turns equal to one-third of the effective turns per phase of said armature winding, a three phase exciting field winding, a condenser connected in series with each phase of said exciting field winding, and means connecting each of said series connected field phases and condensers respectively to a line terminal of the machine.

CARL S. ROYS.

REFERENCES CITED

The following references are of record in the file of this patent:

UNITED STATES PATENTS

| Number | Name | Date |
|---|---|---|
| 455,773 | Stanley et al. | July 14, 1891 |
| 2,014,737 | Japolsky | Sept. 17, 1935 |